（12) United States Patent
Harada et al.

(10) Patent No.: US 6,434,604 B1
(45) Date of Patent: Aug. 13, 2002

(54) CHAT SYSTEM ALLOWS USER TO SELECT BALLOON FORM AND BACKGROUND COLOR FOR DISPLAYING CHAT STATEMENT DATA

(75) Inventors: Katsutoshi Harada; Hiroki Moriya; Shoichi Sato, all of Tokyo (JP)

(73) Assignee: Network Community Creation, Inc., Tokyo (JP)

( * ) Notice: Subject to any disclaimer, the term of this patent is extended or adjusted under 35 U.S.C. 154(b) by 0 days.

(21) Appl. No.: 09/234,113

(22) Filed: Jan. 19, 1999

(30) Foreign Application Priority Data

Jan. 19, 1998 (JP) .......................................... 10-007433

(51) Int. Cl.[7] .............................................. G06F 15/16
(52) U.S. Cl. ........................ 709/207; 709/204; 345/715
(58) Field of Search ................................ 345/419, 715, 345/751, 473; 707/512; 709/207, 204

(56) References Cited

U.S. PATENT DOCUMENTS

| | | | | |
|---|---|---|---|---|
| 5,664,126 A | * | 9/1997 | Hirakawa et al. ............ | 707/512 |
| 5,893,126 A | * | 4/1999 | Drews et al. ................ | 345/751 |
| 5,943,049 A | * | 8/1999 | Matsubara et al. .......... | 345/715 |
| 5,956,038 A | * | 9/1999 | Rekimoto .................... | 345/419 |
| 6,229,533 B1 | * | 5/2001 | Farmer et al. ............... | 345/473 |

* cited by examiner

*Primary Examiner*—Le Hien Luu
(74) *Attorney, Agent, or Firm*—Sughrue Mion, PLLC (57) ABSTRACT

When a chat client receives a message including a nickname 201 of a sender, a statement 202, a user ID 203, and a balloon form number 204, retrieves a color table 301 based on the user ID and retrieves a form table 302 based on the balloon form number. The chat client displays the nickname and the statement in the balloon form with the retrieved color.

6 Claims, 10 Drawing Sheets

FIG. 1
PRIOR ART

```
reiji says:
    You are wasting the holiday.

Urashiman says:
    Is Yanyan off the duty?

yanyan says:
    I was sleeping.

reiji says:
    Well, yes.

reiji says:
    Until one o'clock.

yanyan says:
    I'm back!

Urashiman says:
    Ha ha ha maji quits conversation.
```

CHAT SYSTEM ALLOWS USER TO SELECT BALLOON FORM AND BACKGROUND COLOR FOR DISPLAYING CHAT STATEMENT DATA

BACKGROUND OF THE INVENTION

This invention relates to a method of improving a expression of a chat in the form of text, which is one of communication technologies using a network, such as the Internet.

Figure 1:
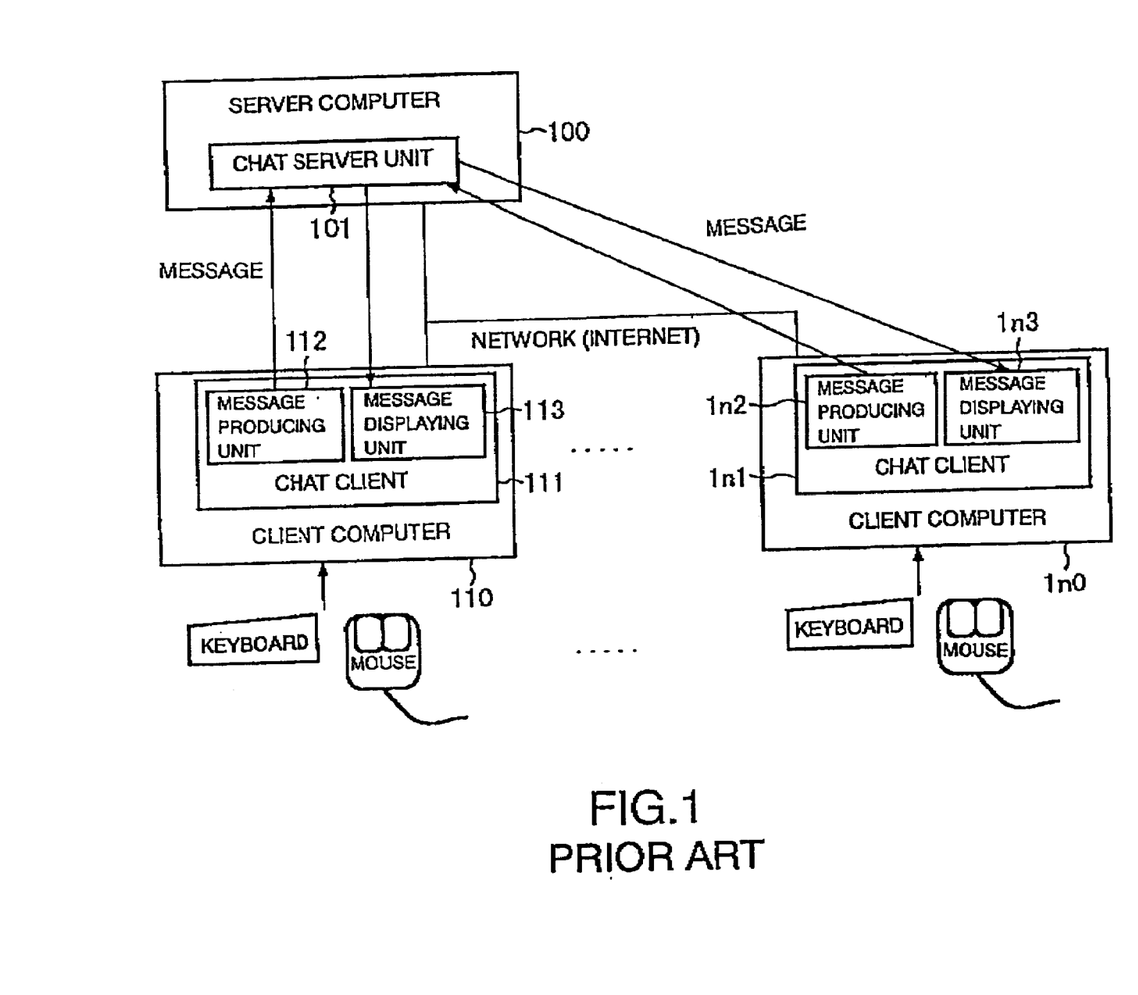
FIG. 1 shows a diagram for use in describing a general configuration of a chat system.

FIG. 1 shows a general configuration of a chat system. The chat system includes a server computer 100 and client computers 110–1n0, n in number. A chat server unit 101 is operated on the server computer and chat clients 111–1n1 are each operated on the corresponding client computer 110–1n1.

The chat client 111 includes a message producing unit 112 and a message displaying unit 113. The server computer 100 includes the chat server unit 101. The chat client 1n1 includes a message producing unit 1n2 and a message displaying unit 1n3.

Sending and receiving operations of a message are performed in the chat system as follows.

The chat client 111 makes up a message at the message producing unit 112, and sends the message to the chat server unit 101 and the message displaying unit 113. The chat server unit 101 collects messages from the chat clients connected the chat server unit, and distributes the collected messages to the chat client 1n1. In this event, the messages are distributed only to the chat clients connected to chat rooms managed by the chat client. The message displaying unit 113 in the chat client 111 and the message displaying unit 1n3 in the chat client 1n1 display the sent messages on the respective screens.

Figure 2:
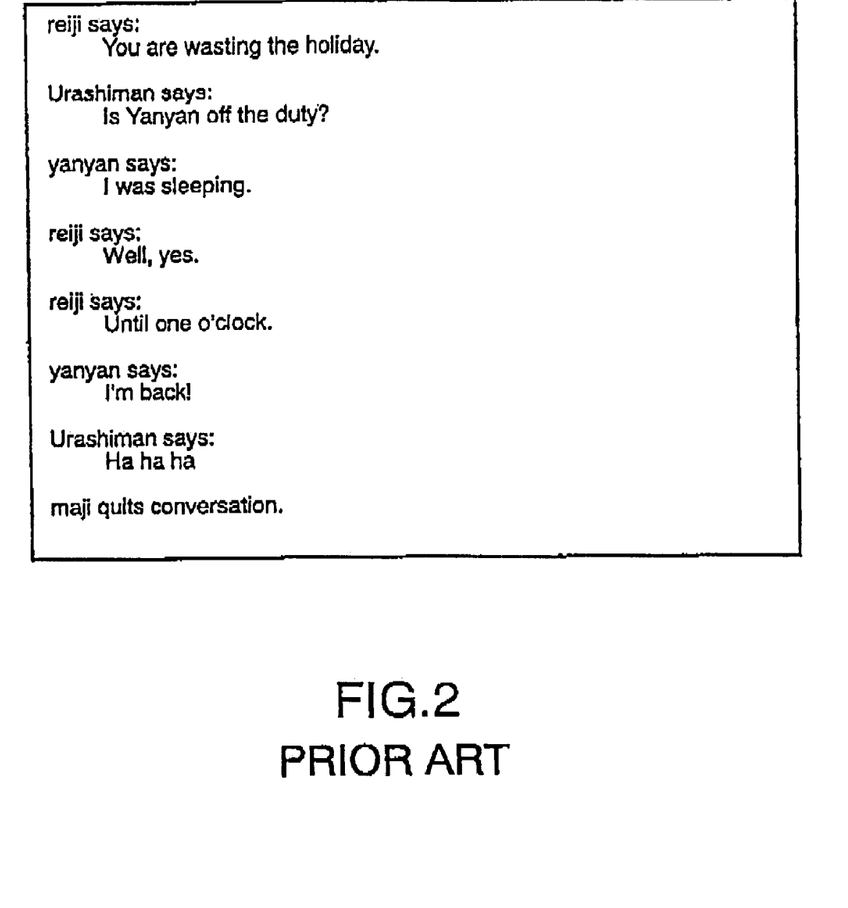
FIG. 2 shows an example of a client image obtained by the conventional chat system.

FIG. 2 shows an example of a conventional chat screen of each of the chat clients. As shown in FIG. 2, in the typical system, messages supplied to the chat clients are displayed on a screen of white background color successively from the upper part to the lower part in a chat or conversation order. Messages displayed on the chat screen include only nicknames (such as "reiji" and "Urashiman" shown in FIG. 2) and their statements.

Figure 3:
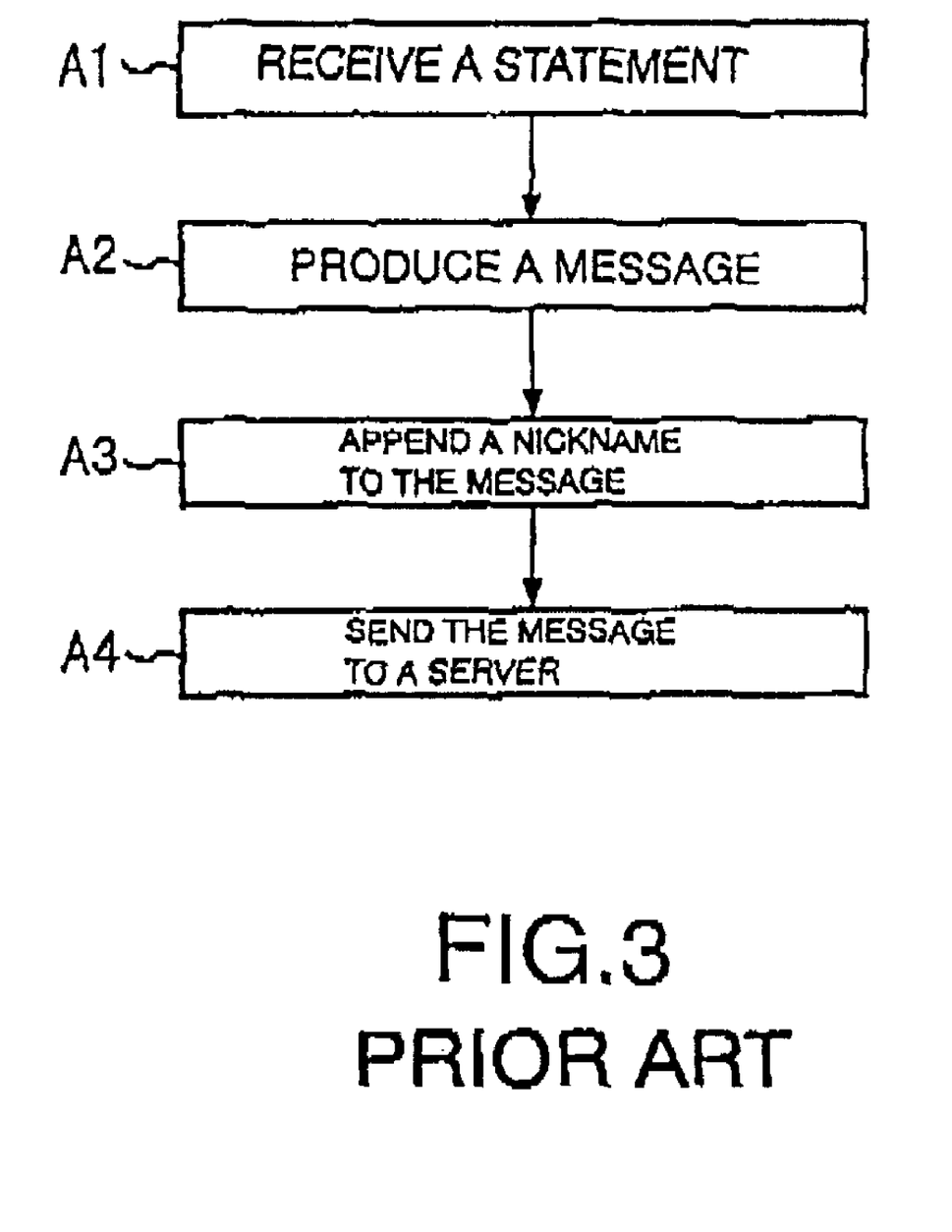
FIG. 3 is a flow chart for showing a processing flow of a message producing unit of the conventional chat system.

FIG. 3 shows an operation flow of the message producing unit in the chat client. In step A1 in FIG. 3, statements are supplied to the message producing unit. Next, the message producing unit of the chat client generates a message on the basis of the statement in step A2 and appends, to the statement, a nickname which corresponds to people who state in step A3. Finally, the message to which the nickname is appended is sent in step A4.

Figure 4:
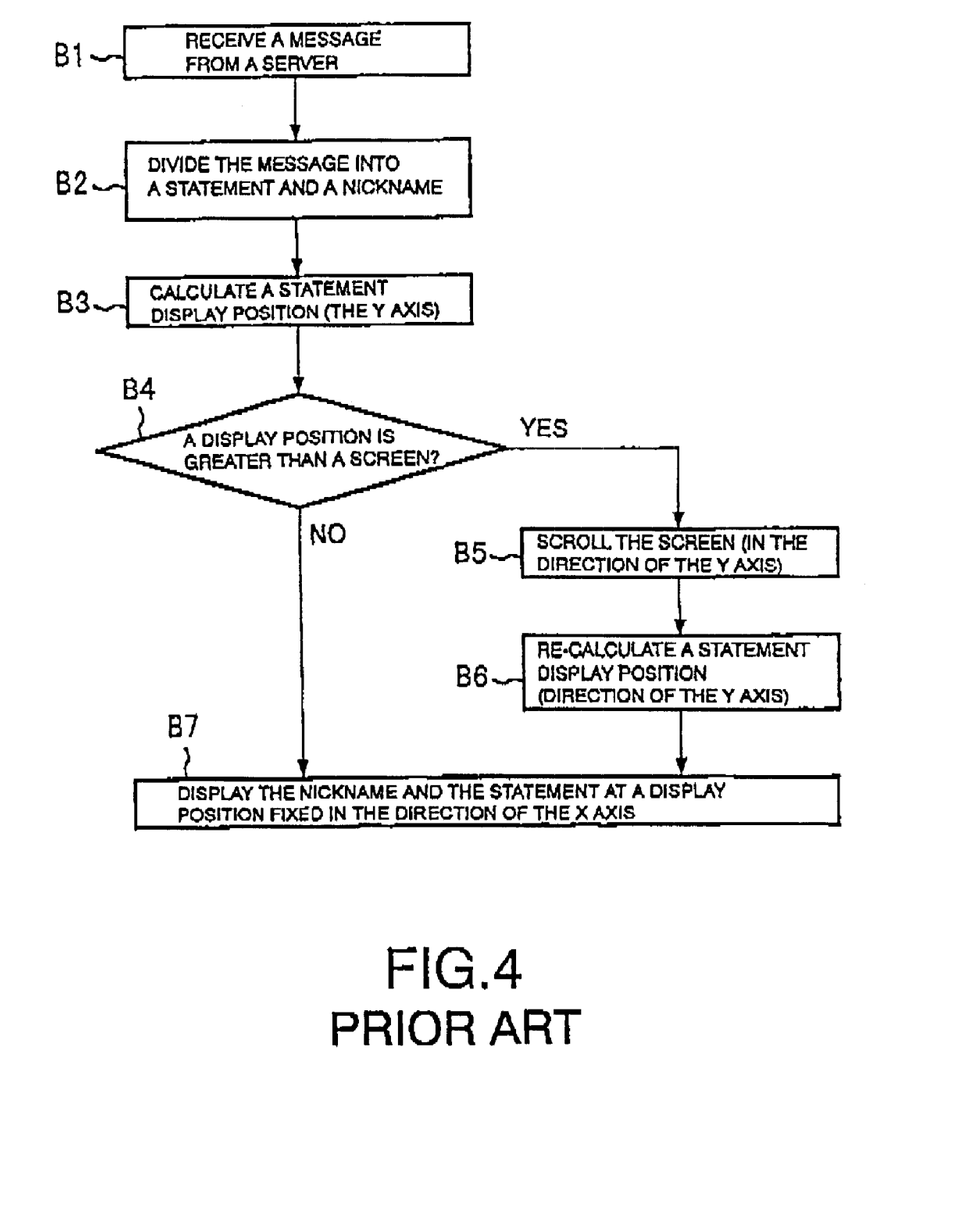
FIG. 4 is a flow chart for showing a processing flow of a message displaying unit in the conventional chat system.

FIG. 4 shows a processing flow of the message displaying unit in the chat client. In step B1 in FIG. 4, the message displaying unit in the chat client receives a message from the server and divides the message into a statement and a nickname in step B2. In step B3, the message displaying unit calculates each display position of the statement and the nickname on a screen. Next, in step B4, the message displaying unit determines whether or not the calculated value of the position exceeds a size of the screen. If the value exceeds the size of the screen, that is, the screen becomes full of messages, processing of the message displaying unit proceeds to step B5. Otherwise, processing is followed by step B7. In step B5, the message displaying unit scrolls the screen and secures an area on which the new message are displayed. Next, in step B6, a new display position of the message is calculated again, and in step B7, the nickname and the statement are displayed. If there is no need to scroll, they are displayed at the position obtained in step B4.

Figure 5:
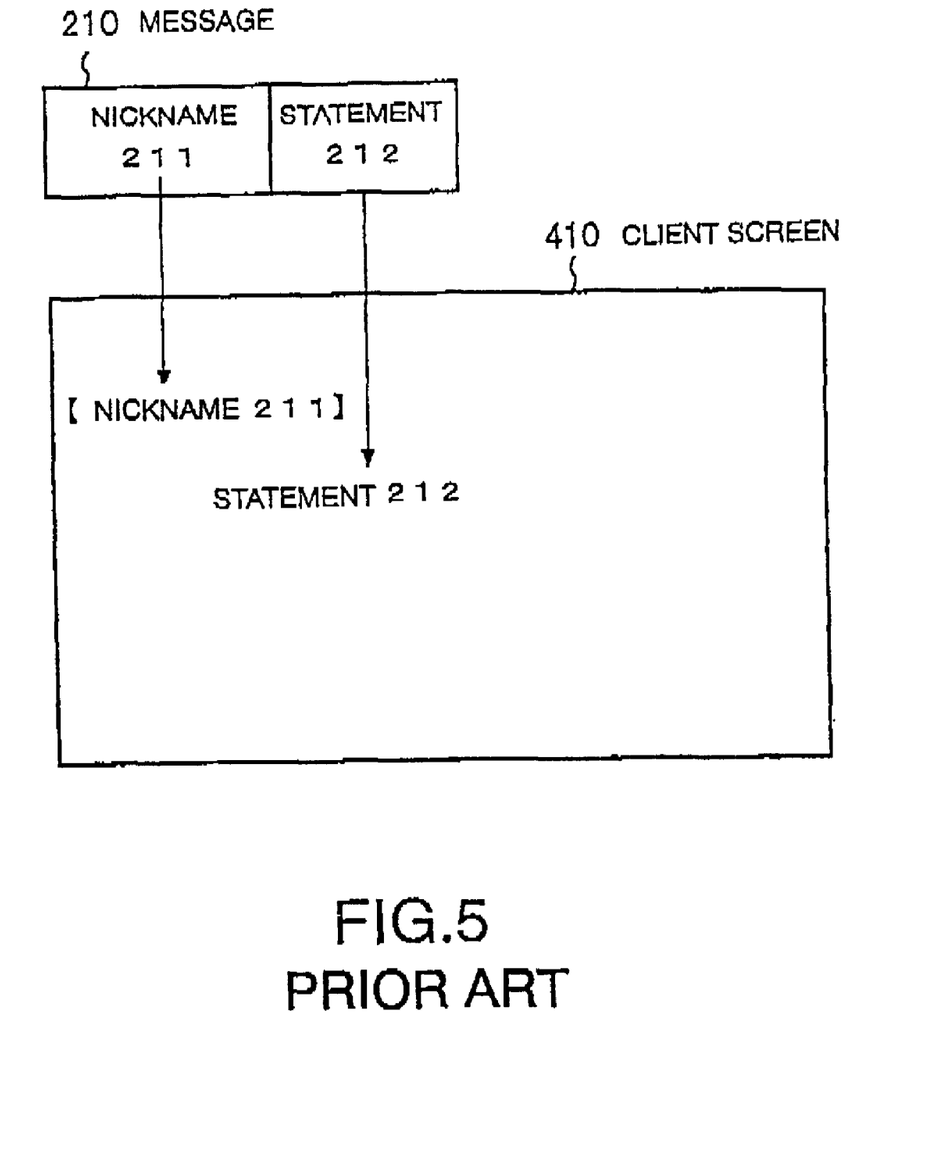
FIG. 5 shows a diagram for use in schematically describing display operation of a client screen in the conventional chat system.

FIG. 5 shows a relationship between a message and contents displayed on a screen. When the chat client receives the message 210 shown in FIG. 5, the message is divided into a nickname 211 and a statement 212 which are displayed on a client screen 410 as shown in FIG. 5.

The conventional chat system has following problems.

A first problem is to lack ability of expression about a chat screen. This is because the background color of the screen is monotonous and, in addition, messages are simply displayed from the left most of the screen, and the messages are constantly displayed from the upper part on the screen to the lower part.

A second problem is that a sender of a message can not convey his/her feelings. This is because representation on display of the statement is standardized, as shown in FIG. 5.

A third problem is that a sender of a message can not easily be distinguished from each other. This is because each sender can not be intuitively recognized who sends the previous statement. Since identification of a sender is displayed on the left most of a screen by using his/her nickname, the nickname must be read again to know a sender of the previous statements.

SUMMARY OF THE INVENTION

It is an object of the invention to provide a text base chat system which improves ability in expression related to feelings and intention of a sender so that smooth communication may be performed via a network (the Internet).

According to the invention, there is provided a chat screen displaying system including a server and a plurality of clients connected to the server via a network, each of the clients including a message producing unit which transfers a message from a sender to the server, and a message displaying unit which displays the transferred message from the server, wherein the message producing unit appends shape information representing a balloon form specified by the sender and sender information representing the sender to statement data representing the statement from the sender to produce the message and to transfer the message to the server and the message displaying unit, and wherein the message displaying unit divides the received message into the statement data and shape information and displays at least the statement data on a screen with the statement surrounded by the balloon form specified by the shape information.

It is also desirable that the message producing unit further appends a user ID of the sender to the message and transfers the message, and wherein the message displaying unit retrieves a color table which resides in the message displaying unit based on the user ID, and displays the statement data using the retrieved color as a background color in the balloon form related to the statement data.

Further, it is desirable that the message displaying unit sets a new color as a background color which corresponds to the user ID and stores the new color and the corresponding user ID in the color table, when a color which corresponds to the user ID is not present in the color table.

Further, it is desirable that the message displaying unit displays the balloon form at random on the screen.

According to the above invention, when a statement is displayed on a screen, it allows to display a balloon-formed frame which surrounds the statement and the shape of the frame can be easily selected by a user. Further, it allows to display an image on a background of the screen used to display chat message, and display a statement in random position in lateral direction. Further, in displaying the statement, it allows to display the statement with color which corresponds to its sender.

DESCRIPTION OF THE PREFERRED EMBODIMENT

A schematic configurations of a chat system of the invention is similar to the typical system mentioned in the preamble of the instant specification. However, the system of the invention can extend a content of a message of the typical system by newly appending a user ID and a balloon form number to the message at a message producing unit. In conformity with such extension, operations of the message producing unit are modified also.

Further, functions to display a background for a chat client are appended to a chat server and a chat client. The chat client sends information for selecting chat rooms which are managed by the chat server to the chat server, when the chat client is connected to the chat server. The chat server, in response to the information, sends a background image data which corresponds to a chat room to the chat client. The chat client uses the background image data as background of a screen of the chat client.

Figure 6:
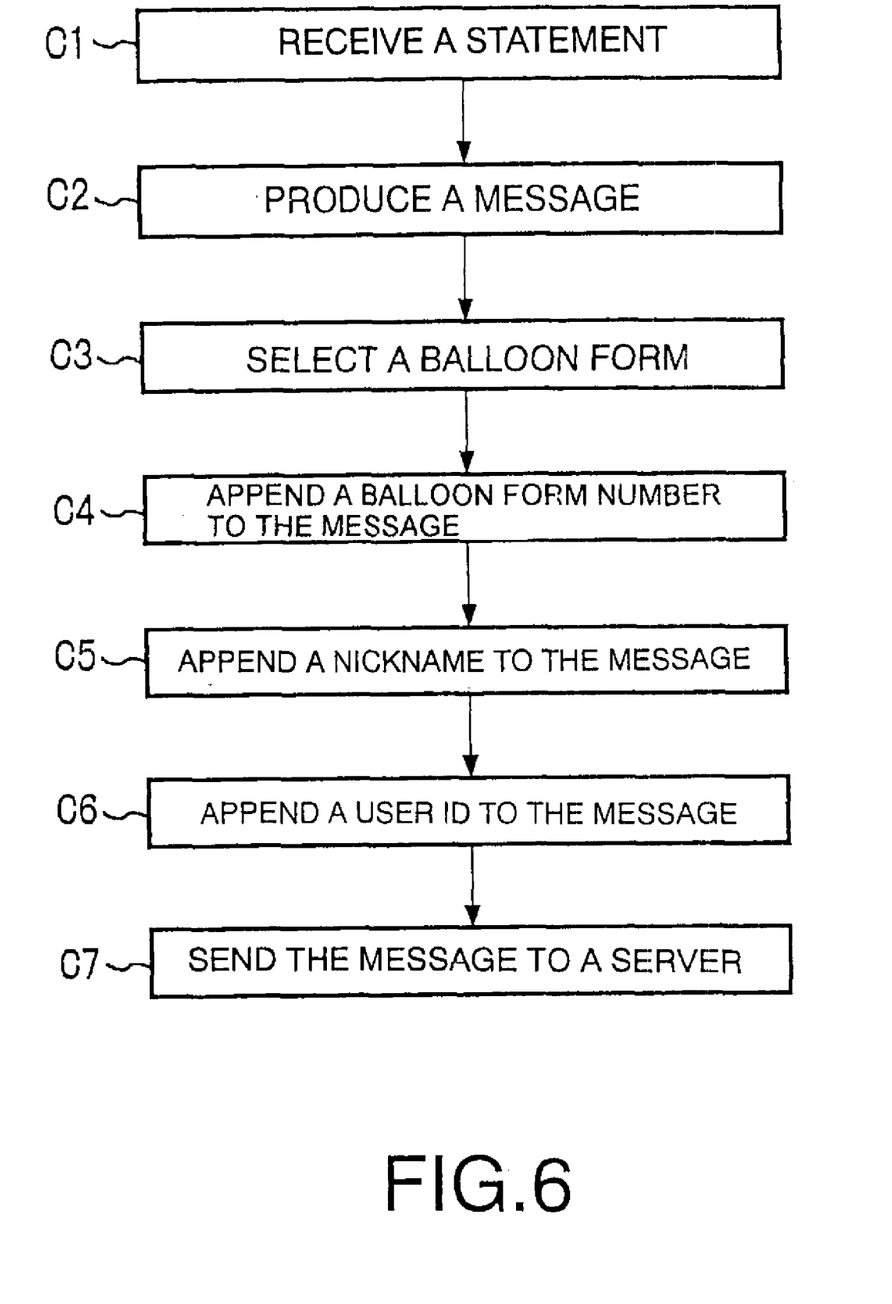
FIG. 6 is a flow chart for showing a processing flow of a message producing unit in a chat system of the invention.

FIG. 6 shows a processing flow of a message producing unit in the chat client of the system.

In step C1 in FIG. 6, the message producing unit of the chat client receives a statement from a sender. In step C2, the message producing unit produces a message based on the statement. In step C3, the message producing unit receives a number which corresponds to a balloon form selected by a sender. In step C4, the message producing unit appends, to the message produced in the step C2, the number which corresponds to a balloon form.

Next, in step C5, the message producing unit appends a nickname of the sender to the message. Then, in step C6, appends a user ID assigned to the sender to the message to which the nickname has been appended. Finally, in step C7, the message producing unit sends thus produced message to the server and the message displaying unit in the same chat client.

Figure 7:
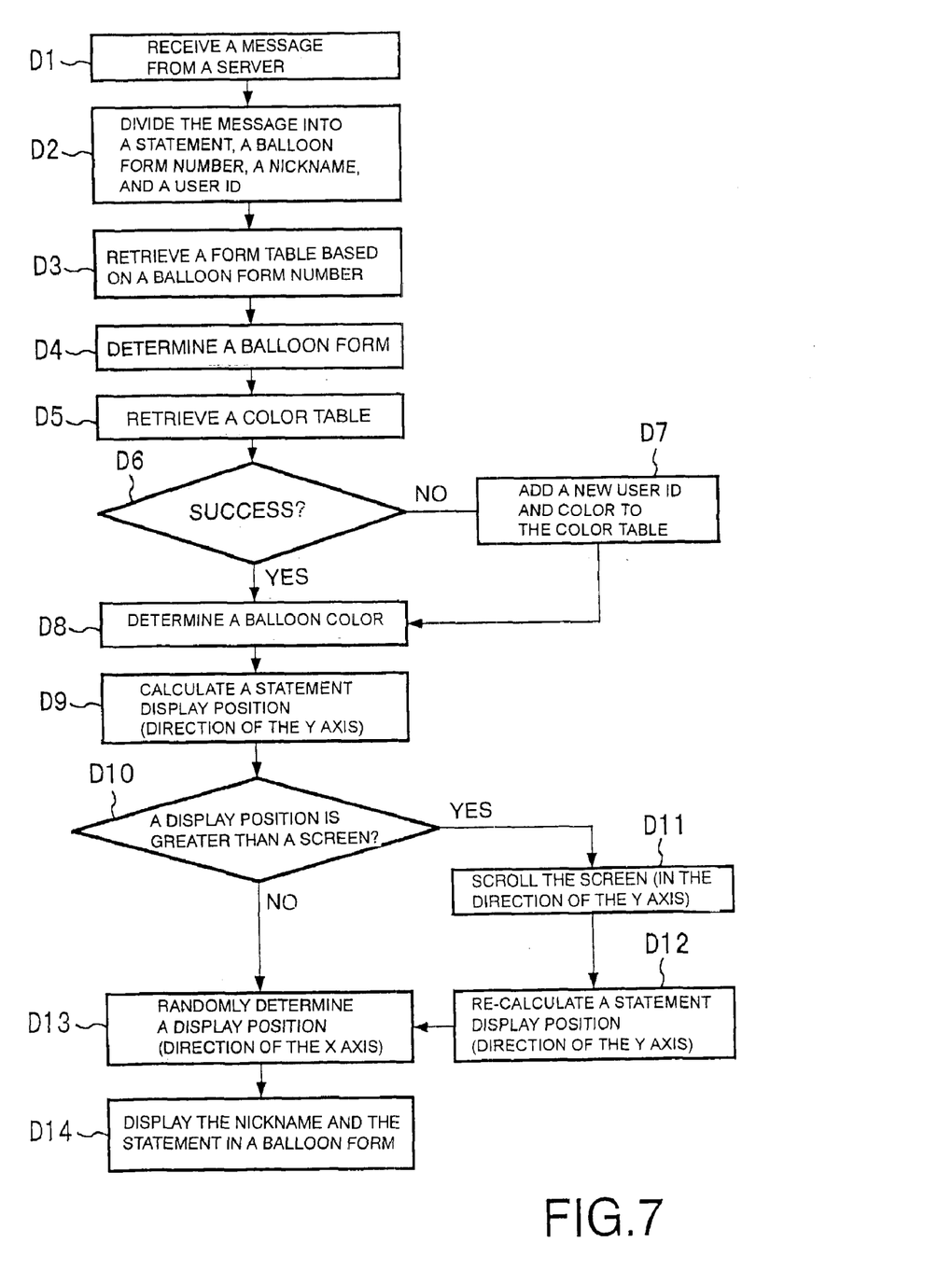
FIG. 7 is a flow chart for showing a processing flow of a message displaying unit in the chat system of the invention.

FIG. 7 shows a processing flow of a message displaying unit in a chat client of the system.

In step D1 in FIG. 7, the message displaying unit receives a message from a server and in step D2, divides the message into a statement, a nickname, a user ID, and a balloon form number. In step D3, the message displaying unit retrieves a table including a correspondence between a balloon form number and a balloon form and determines the balloon form.

Next, in step D5, the message displaying unit retrieves a color table based on a user ID and in step D6, determines whether or not the corresponding color resides in the color table. The color table is included in the message displaying unit. If the color which corresponds to the user ID is present in the color table, the color and the balloon form are used to be displayed in the later step D14.

If the retrieval does not succeed in step D6, the message displaying unit newly registers a set of the user ID and the color into the color table in step D7. In the later step D14, the newly added color is used to display a balloon form.

Next, in step D9, the message displaying unit calculates a position (along the Y axis) of displaying the statements. Then, if it is determined that the value of the calculated position is greater than the maximum in the Y coordinates of the screen in step D10, that is, the screen has already been filled with messages, the message displaying unit scrolls the screen in step D11 and secures, on the screen, an area on which the new messages may be displayed. And in step D12, display position (along the Y axis) of the statements is calculated again in step D12.

If there is no need to scroll, in step D14, the Y coordinates obtained in step D9 are used as described later.

Furthermore, in step D13, the message displaying unit randomly determines display positions (along the X axis) of the statements and in step D14, the nickname and the statements are displayed using the balloon form and the color.

Figure 8:
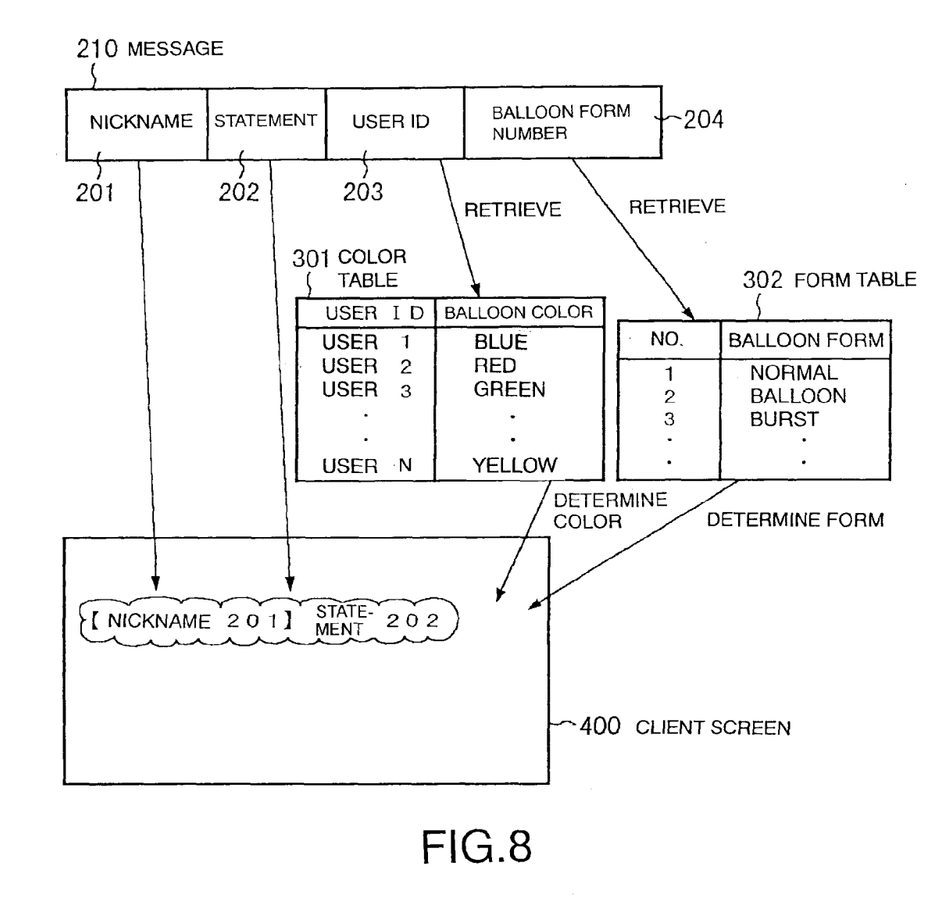
FIG. 8 shows a diagram for use in schematically describing display operation of a client screen in the chat system of the invention.

FIG. 8 shows a relationship among data which appears on displaying the messages on the message displaying unit of the chat client. The message 210 includes a nickname 201, a statement 202, a user ID 203, and a balloon form number 204. The color of the balloon form is uniquely obtained by retrieving a color table 301 using the user ID 203 as a key. The balloon form is determined by retrieving a form table 302 using a balloon form number as a key.

The nickname 201 and the statement 202 are displayed on the screen of the client in the form of the balloon form. Also, when they are displayed, display positions (in the lateral direction) of the statement is randomly determined.

Figure 9:
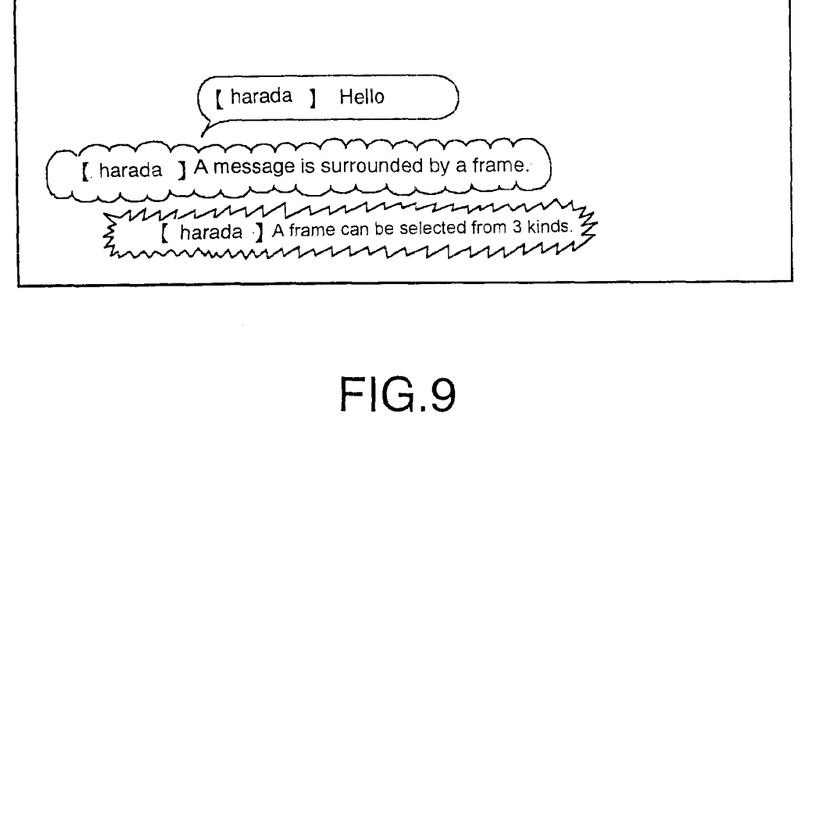
FIG. 9 shows an example of a chat screen according to one embodiment of the invention.

Thus displayed chat screen are shown in FIG. 9.

Figure 10:
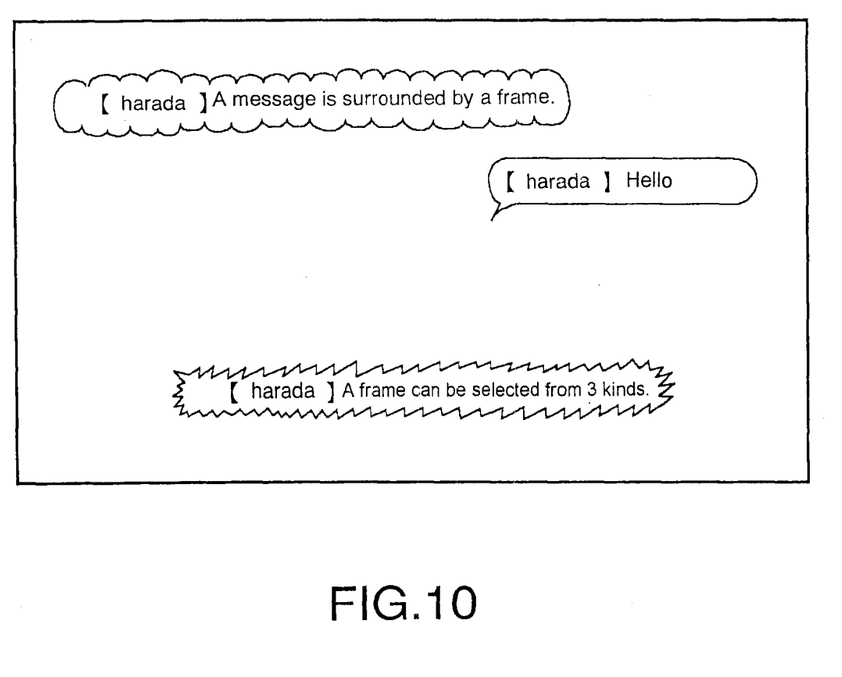
FIG. 10 shows an example of a chat screen according to another embodiment of the invention.

Next, description is made about another embodiment of the invention with reference to FIG. 10. The embodiment displays messages on the screen randomly also in the Y axis compared to the chat screen, shown in FIG. 9, which displays the messages from the upper part to the lower part of the screen according to the order the messages are received. Also, the message displaying unit may lighten the color of the balloon form as the time passes and the color of the balloon form fade away when a predetermined time lapses so that the screen may not be filled with the balloon form.

A first effect is to improve or increase ability of expression on a chat screen. This is because images are displayed on a background together with messages surrounded by frames, and the messages may not be always displayed on the left most of a screen but may be displayed at random on the screen.

A second effect is that a user can emphasize messages. This is because each frame of messages sent from a sender can be changed according to intent of the sender.

A third effect is that a sender can be easily identified from his/her messages. This is because a background color of the messages has been uniquely determined for every sender.

What is claimed is:

1. A chat screen displaying system including a server and a plurality of clients connected to the server via a network, each of the clients including a message producing unit which transfers a message from a sender to the server, and a message displaying unit which displays the transferred message from the server;

wherein the message producing unit appends shape information representing a balloon form specified by the sender and sender information representing the sender to statement data representing the statement from the sender to produce the message and to transfer the message to the server and the message displaying unit;

wherein the message displaying unit divides the received message into the statement data and shape information and displays at least the statement data on a screen with the statement surrounded by the balloon form specified by the shape information;

wherein the message producing unit further appends a user ID of the sender to the message and transfers the message;

wherein the message displaying unit retrieves a color table, which resides in the message displaying unit based on the user ID, and displays the statement data using the retrieved color as a background color in the balloon form related to the statement data; and     wherein the balloon form is specified by the sender by selecting the balloon form from a plurality of balloon forms, each having a distinct shape.

2. The chat screen displaying system of claim 1, wherein the message displaying unit displays the balloon form at random on the screen.

3. The chat screen displaying system of claim 1, wherein the each of the clients sends information for specifying a chat room to the server when the client is connected to the server, the server sends, to the client, background image data which corresponds to the chat room in response to the information, and the client displays the message on the screen with the received background image data.

4. The chat screen displaying system of claim 1, wherein the message displaying unit sets a new color as a background color which corresponds to the user ID and stores the new color and the corresponding user ID in the color table, when a color which corresponds to the user ID is not present in the color table.

5. The chat screen displaying system of claim 4, wherein the message displaying unit displays the balloon form at random on the screen.

6. The chat screen displaying system of claim 4, wherein the each of the clients sends information for specifying a chat room to the server when the client is connected to the server, the server sends, to the client, background image data which corresponds to the chat room in response to the information, and the client displays the message on the screen with the received background image data.

* * * * *